US008362888B2

(12) United States Patent
Roberts, Sr. et al.

(10) Patent No.: US 8,362,888 B2
(45) Date of Patent: *Jan. 29, 2013

(54) INFORMATION TRANSMISSION AND PROCESSING SYSTEMS AND METHODS FOR FREIGHT CARRIERS

(75) Inventors: Ralph L. Roberts, Sr., Reddick, FL (US); Chris Deck, Wilmington, OH (US); Steve Crandall, New Vienna, OH (US)

(73) Assignee: R&L Carriers, Inc., Wilmington, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 13/439,227

(22) Filed: Apr. 4, 2012

(65) Prior Publication Data

US 2012/0200434 A1 Aug. 9, 2012

Related U.S. Application Data

(60) Continuation of application No. 13/338,577, filed on Dec. 28, 2011, now Pat. No. 8,188,847, which is a division of application No. 12/177,946, filed on Jul. 23, 2008, now Pat. No. 8,179,238.

(60) Provisional application No. 60/951,372, filed on Jul. 23, 2007.

(51) Int. Cl.
*G08B 21/00* (2006.01)

(52) U.S. Cl. .............. 340/431; 340/572.1; 701/29.1

(58) Field of Classification Search .............. 340/431, 340/572.1; 701/29, 32, 33, 35
See application file for complete search history.

(56) References Cited

U.S. PATENT DOCUMENTS

| | | |
|---|---|---|
| 3,711,862 A | 1/1973 | Story |
| 3,979,731 A | 9/1976 | Naplatanov et al. |
| 4,360,875 A | 11/1982 | Behnke |
| 4,799,156 A | 1/1989 | Shavit et al. |
| 4,832,204 A | 5/1989 | Handy et al. |
| 4,888,692 A | 12/1989 | Gupta et al. |
| 5,051,914 A | 9/1991 | Sansone et al. |
| 5,122,959 A | 6/1992 | Nathanson et al. |
| 5,142,278 A | 8/1992 | Moallemi et al. |
| 5,168,444 A | 12/1992 | Cukor et al. |
| 5,168,451 A | 12/1992 | Bolger |
| 5,265,006 A | 11/1993 | Asthana et al. |
| 5,272,324 A | 12/1993 | Blevins |
| 5,278,750 A | 1/1994 | Kaneko et al. |

(Continued)

FOREIGN PATENT DOCUMENTS

| | | |
|---|---|---|
| DE | 29700373 | 3/2009 |
| WO | WO98/40837 | 9/1998 |

OTHER PUBLICATIONS

Business Wire, "HighwayMaster Unveils Portable Version of Their Award-Winning Mobile Communications System," Mar. 20, 1997.

(Continued)

*Primary Examiner* — John A Tweel, Jr.
(74) *Attorney, Agent, or Firm* — Dinsmore & Shohl LLP

(57) ABSTRACT

Methods and systems for remotely monitoring trailer or trailers attached to a vehicle is provided. The method includes associating an identification tag or ABS ECU that is configured to broadcast a trailer identification signal with a trailer. The method further includes receiving the trailer identification signal on-board the vehicle, associating the trailer identification signal with the vehicle, transmitting the trailer identification signal to a remote processor and receiving the trailer identification signal at the remote processor. The system comprises a mobile data terminal capable of generating and responding to telematic events comprising at least one processor, a graphical user interface, an input device, a memory and a set of executable instructions which may include a plurality of modules, such as a vehicle location module capable of receiving a GPS signal and transmitting the GPS signal to a remote processor for determining a location of a transportation unit.

14 Claims, 11 Drawing Sheets

U.S. PATENT DOCUMENTS

| | | |
|---|---|---|
| 5,333,177 A | 7/1994 | Braitberg et al. |
| 5,442,810 A | 8/1995 | Jenquin |
| 5,479,479 A | 12/1995 | Braitberg et al. |
| 5,485,369 A | 1/1996 | Nicholls et al. |
| 5,528,489 A | 6/1996 | Asahara et al. |
| 5,535,274 A | 7/1996 | Braitberg et al. |
| 5,539,810 A | 7/1996 | Kennedy et al. |
| 5,594,425 A | 1/1997 | Ladner et al. |
| 5,678,196 A | 10/1997 | Doyle et al. |
| 5,689,562 A | 11/1997 | Hassan et al. |
| 5,732,074 A | 3/1998 | Spaur et al. |
| 5,818,528 A | 10/1998 | Roth et al. |
| 5,821,518 A | 10/1998 | Sussmeier et al. |
| 5,822,427 A | 10/1998 | Braitberg et al. |
| 5,857,029 A | 1/1999 | Patel |
| 5,880,958 A | 3/1999 | Helms et al. |
| 5,892,441 A | 4/1999 | Woolley et al. |
| 5,910,896 A | 6/1999 | Hahn-Carlson |
| 5,940,117 A | 8/1999 | Hassan et al. |
| 5,969,321 A | 10/1999 | Danielson et al. |
| 5,974,356 A | 10/1999 | Doyle et al. |
| 6,026,292 A | 2/2000 | Coppinger et al. |
| 6,075,458 A | 6/2000 | Ladner et al. |
| 6,084,528 A | 7/2000 | Beach et al. |
| 6,084,870 A | 7/2000 | Wooten et al. |
| 6,108,591 A | 8/2000 | Segal et al. |
| 6,122,514 A | 9/2000 | Spaur et al. |
| 6,124,810 A | 9/2000 | Segal et al. |
| 6,154,658 A | 11/2000 | Caci |
| 6,253,129 B1 | 6/2001 | Jenkins et al. |
| 6,285,916 B1 | 9/2001 | Kadaba et al. |
| 6,304,856 B1 | 10/2001 | Soga et al. |
| 6,317,668 B1 | 11/2001 | Thibault |
| 6,331,825 B1 | 12/2001 | Ladner et al. |
| 6,341,218 B1 | 1/2002 | Poplawsky et al. |
| 6,354,493 B1 | 3/2002 | Mon |
| 6,363,323 B1 | 3/2002 | Jones |
| 6,377,357 B1 | 4/2002 | Sato et al. |
| 6,377,825 B1 | 4/2002 | Kennedy et al. |
| 6,421,590 B2 | 7/2002 | Thibault |
| 6,430,164 B1 | 8/2002 | Jones et al. |
| 6,516,192 B1 | 2/2003 | Spaur et al. |
| 6,526,341 B1 | 2/2003 | Bird et al. |
| 6,571,213 B1 | 5/2003 | Altendahl et al. |
| 6,634,551 B2 | 10/2003 | Barta et al. |
| 6,643,319 B1 | 11/2003 | Suzuki et al. |
| 6,678,612 B1 | 1/2004 | Khawam |
| 6,785,718 B2 | 8/2004 | Hancock et al. |
| 6,810,235 B2 | 10/2004 | Smith et al. |
| 6,816,090 B2 | 11/2004 | Teckchandani et al. |
| 6,879,962 B1 | 4/2005 | Smith et al. |
| 6,898,435 B2 | 5/2005 | Milman |
| 6,902,109 B2 | 6/2005 | Barta et al. |
| 6,922,133 B2 | 7/2005 | Wolfe |
| 6,957,197 B1 | 10/2005 | Altendahl et al. |
| 6,970,825 B1 | 11/2005 | Altendahl et al. |
| 6,990,336 B2 | 1/2006 | Parisi |
| 7,065,347 B1 | 6/2006 | Vikse et al. |
| 7,212,984 B2 | 5/2007 | Wolfe et al. |
| 7,242,279 B2 | 7/2007 | Wolfe |
| 7,327,250 B2 | 2/2008 | Harvey |
| 7,346,370 B2 | 3/2008 | Spaur et al. |
| 7,366,892 B2 | 4/2008 | Spaur et al. |
| 7,401,030 B1 | 7/2008 | Mather et al. |
| 7,881,838 B2 | 2/2011 | Larschan et al. |
| 8,188,847 B2 * | 5/2012 | Roberts et al. ............ 340/431 |
| 2002/0007302 A1 | 1/2002 | Work et al. |
| 2002/0055817 A1 | 5/2002 | Chou |
| 2002/0059075 A1 | 5/2002 | Schick et al. |
| 2002/0073170 A1 | 6/2002 | Hoffman et al. |
| 2003/0004747 A1 | 1/2003 | Burton |
| 2003/0013481 A1 | 1/2003 | Vassilovski et al. |
| 2003/0114206 A1 | 6/2003 | Timothy et al. |
| 2004/0084519 A1 | 5/2004 | Barta et al. |
| 2004/0211834 A1 | 10/2004 | Fleckenstein et al. |
| 2004/0215480 A1 | 10/2004 | Kadaba |
| 2005/0006470 A1 | 1/2005 | Mrozik et al. |
| 2005/0065678 A1 | 3/2005 | Smith et al. |
| 2005/0085963 A1 | 4/2005 | Kapolka et al. |
| 2005/0119786 A1 | 6/2005 | Kadaba |
| 2007/0050108 A1 | 3/2007 | Larschan et al. |
| 2007/0152802 A1 | 7/2007 | Knoll et al. |
| 2008/0064420 A1 | 3/2008 | Aldern et al. |

OTHER PUBLICATIONS

Wendy Leavitt, Fleet Owner, "The Convergence Zone," Jun. 1, 1998.
Christy Doering, Business Wire, "HighwayMaster Introduces Fax Interface Capabilities," May 15, 1996.
HighwayMaster Communication 10-K, SEC filing on Dec. 31, 1997.
Kaifeng Zeng, "Dynamic Vehicle Routing Problem with Backhaul and Time Window and its Application in the Less-Than-Truckload (LTL) Trucking Industry," Thesis submitted to the University of Cincinnati, Mar. 2006.

* cited by examiner

INFORMATION TRANSMISSION AND PROCESSING SYSTEMS AND METHODS FOR FREIGHT CARRIERS

RELATED APPLICATIONS

This application is a continuation of U.S. patent application Ser. No. 13/338,577 filed Dec. 28, 2011, which is a divisional of U.S. patent application Ser. No. 12/177,946 filed Jul. 23, 2008 and claims the benefit of U.S. Provisional Application No. 60/951,372, filed Jul. 23, 2007. The entire disclosure of which are hereby incorporated by reference.

TECHNICAL FIELD

The present invention relates generally to document transmission and processing systems for freight carriers, and in one embodiment to such systems and methods having document type detection, driver prompting, scan quality determination, automated access of metadata, and automated tracking of trailers and dollies.

BACKGROUND

The shipping industry consists primarily of three types of carriers, each offering services that satisfy different customer needs. There are small package carriers like Federal Express, United Parcel Service and others who pick up small packages, consolidate these packages into large loads, move them close to their destination point and then deliver the packages. At the opposite end of the shipping business are the large customers which fill entire trucks or trailer loads and are considered to be truck load shippers. The category in between the truck load shippers and the small package shippers are less-than-truckload (LTL) carriers. Similar to the UPS driver who collects and delivers many small packages during a business day, the less-than-truckload (LTL) carrier picks up freight from upwards of 20 different customers. This freight is typically destined to many different locations around the country. The freight is brought back to a terminal where the shipments are unloaded from the truck, consolidated with other freight moving in the same direction and then reloaded on delivery trucks. The freight is sorted and consolidated into truck loads at the terminal to minimize the empty space on the truck that will transport the freight from the local terminal to either a local delivery or a distribution terminal in another city or state. At the distribution terminal the truck will be unloaded and its freight restored and reconsolidated for delivery to customers in the local area around the distribution terminal or shipment to another distribution terminal.

Each individual shipment is governed by a separate contract called a "bill of lading." Often, customers will have their own bill of lading form that they use for shipping. Thus, over the course of a day a truck driver may collect many different bill of lading forms, one for each shipment. Moreover, as the driver drops off shipments, the driver will provide and generate many delivery receipts. The driver deals with many other documents as well during the course of the day, including customs documents and the like.

As in any business, efficiency and speed are measuring sticks for customer service. As an internal matter, as with any other business, the faster payment is received, the better the cash flow. The speed and efficiency of these processes are what gives a trucking or other carrier a competitive edge. Typically, a truck driver will leave the truck terminal in the morning and return in the evening. When he returns he has a hand full of bill of lading forms and other documents which is submitted to the corporate office where it is processed by billing clerks using data entry skills. After the information from each bill of lading is entered, the shipping information is transmitted to the loading dock at the terminal so that the freight moving to common points can be consolidated and the delivery schedule planned.

The goal of proper load planning is to deliver the freight on time with the delivery truck leaving the terminal with a full load. Unfortunately, in some typical systems, both the truck used to pick up the freight and the truck used to deliver the freight are often sitting idle at the terminal while the data entry and load planning functions are being performed. Additionally, in these systems, because the freight typically comes in one truck at a time the loading dock may not know in advance of the trucks' arrival at the terminal or the contents and the destination of the freight picked up on a given day. Consequently, a delivery truck will often depart the terminal only partially loaded. Many of these partially loaded trucks could have been fully loaded had the load planner known about unscheduled freight that had been picked up and would soon arrive at the terminal. This movement of freight as partial also results in decreased efficiency, increased costs and reduced profits for the trucking company.

While some systems have the ability to scan and transmit documents, improvements are desired. For example, some systems require manual entry of the type of document and association of data therewith. Moreover, typical systems cannot assist the driver in making sure all data is provided or that documents are scanned correctly. Moreover, some systems can scan and transmit images but association of data corresponding to the images requires significant manual effort. Moreover, such systems do not typically track or provide information regarding the trailer or dolly assets being transported. Accordingly, improvements in the efficiency and capability of document transmission and processing systems for freight carriers are desired.

SUMMARY

According to one embodiment, method of remotely monitoring trailer or trailers attached to a vehicle is provided. The method includes associating an identification tag that is configured to broadcast a trailer identification signal with a trailer. The method further includes receiving the trailer identification signal on-board the vehicle, associating the trailer identification signal with the vehicle, transmitting the trailer identification signal to a remote processor and receiving the trailer identification signal at the remote processor. The method may be effectuated through use of a mobile data terminal.

According to another embodiment, a method of remotely monitoring at least one trailer attached to a vehicle utilizing an ABS electronic control unit is also provided. The method includes establishing a communication with an ABS electronic control unit located on the at least one trailer, receiving the ABS identification number from the ABS electronic control unit, associating the ABS identification number with the at least one trailer, transmitting the ABS identification number to a remote processor, and receiving the ABS identification number at the remote processor. The method may be effectuated through use of a mobile data terminal.

According to yet another embodiment, a method of dynamically generating telematic events in a transportation operation comprising at least one vehicle hooked to at least one trailer and a remote processor is provided. A geofence surrounding at least one point of interest is defined. A vehicle location signal is transmitted from a vehicle to a remote processor that receives the signal. The method further includes determining whether the vehicle location is within the geofence surrounding the point of interest and accessing information associated with the point of interest. An event is generated based at least in part upon the physical location of the vehicle and the information associated with the point of interest.

According to yet another embodiment, a mobile data terminal capable of generating and responding to telematic events is provided. The mobile data terminal includes at least one processor, a graphical user interface, a user input device, a memory and a set of executable instructions residing on the processor. The set of executable instructions may include a plurality of modules, such as a vehicle location module capable of receiving a global positioning system signal and transmitting the global positioning system signal to a remote processor for determining a location of a transportation unit. A geofencing module is also included, and is configured to define an area surrounding a location of interest, dynamically transmit estimated time of arrival data to a customer when the unit is within the area, automatically announce an arrival of a transportation unit at a point of interest and dynamically generate and transmit an advance loading manifest to a remote facility when the unit is within the area.

BRIEF DESCRIPTION OF THE DRAWINGS

While the specification concludes with claims particularly pointing out and distinctly claiming the present inventions, it is believed the same will be better understood from the following description taken in conjunction with the accompanying drawings in which:

Figure 1:
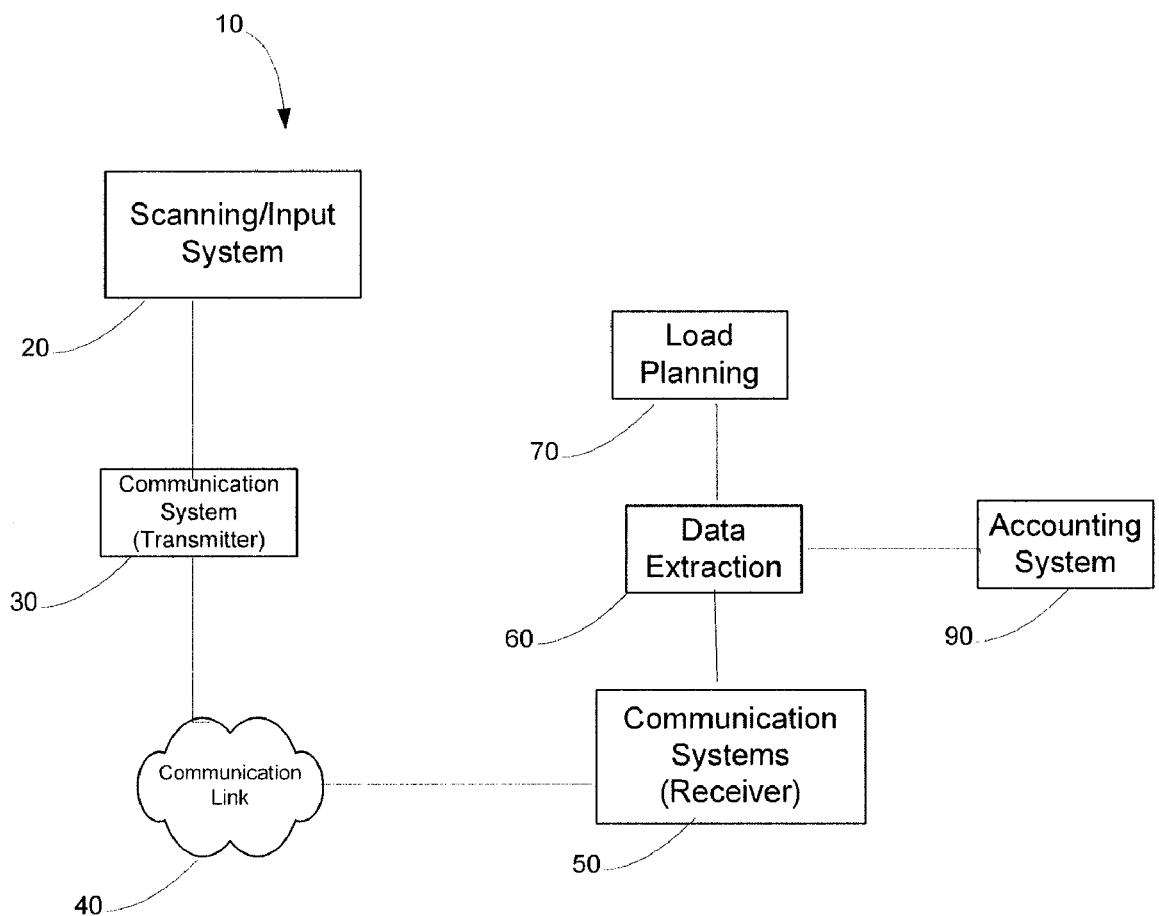
FIG. 1 is a block diagram of a load planning and billing system setup that may be utilized with embodiments of the present invention.

The embodiments set forth in the drawings are illustrative and exemplary in nature and not intended to be limiting of the inventions defined by the claims. Moreover, the individual features of the drawings will be more fully apparent and understood in view of the detailed description.

DESCRIPTION OF THE ILLUSTRATIVE EMBODIMENTS

In general, some embodiments have the ability to detect the type of shipping document that is being scanned. For example, whether the document is a delivery receipt, a bill of lading, a customs document, or the like, can be automatically determined by the software on the mobile data terminal or in the remote data center. The shipping document type can be determined based upon a bar code on the document or special notation or marking on the document, by characters in the document (e.g., OCR) or when the document is scanned (e.g., driver had arrived at a delivery stop). In one exemplary embodiment, the context and timing of when the document is scanned could be utilized to provide information about the document's type. If the driver's route is known and he is arriving/departing at stops and documents are scanned at the stop before departing information can be inferred. For instance if the driver has arrived at a customer and is scheduled to deliver two shipments and then documents are scanned before he departs it is likely they are Delivery Receipts. However if the driver also picked up a shipment while making the deliveries one of the documents being scanned could be a bill of lading. While this approach is not foolproof, it can provide an effective option as part of an overall solution.

Then, based upon the document type, the document can be routed to the appropriate software/server and, depending on the type of document, the driver can be requested to enter additional information about the document. For example, if the document is detected as a delivery receipt, the driver can be immediately prompted to acknowledge whether the shipment was damaged or was missing items, or whether the liftgate was used. As another example if the document was detected as a bill of lading, the driver could be immediately prompted to enter the number of handling units, the weight, and the destination zip code, whether there is any hazardous material, and whether the liftgate was utilized. Additionally, codes on the document can be automatically detected and the page number of the document can be determined. Thus, it can be automatically determined when a new shipping document starts, and when what is being scanned is for a different shipment. As one alternative, a graphical user interface, or keys, can be provided to allow the driver to indicate when a new document starts/stops and what document type is present.

The method and systems of the illustrated embodiments of the present invention provide one or more of the following advantages: identification of the driver of the tractor; tractor identification and associated information of the tractor (i.e., location, tire pressure, maintenance, communication, and/or emergency/collision notification); the trailer identification and associated information of the trailer (i.e., location, tire pressure, maintenance, communication, etc.); dolly identification and associated information; and unit location, arrivals and departures.

In one embodiment, the scanner and/or system analyzes the shipping document image and determines whether to alert the driver to rescan the image. For example, the software could determine if the image is wrinkled (e.g., by looking for data that corresponds to a wrinkle or by analyzing the text), is scanned too light (e.g., >90% brightness) or too dark (e.g., <10% brightness) to be read (by determining the brightness of the image, or by determining how much text is present in the image). Then, the driver can be immediately alerted to rescan the image such that it can be utilized right away by the system (otherwise, the remote data center would need to wait until the arrival of the hardcopy of the shipping document before processing can begin for it).

In some embodiments, additional document metadata is created and associated with the shipping document, either at the mobile data terminal or at the remote data center. The data can be generated based upon geocoded information. For example, a GPS unit on the truck can determine the driver location and that location transmitted to the remote data center. Accordingly, when the data center system receives the GPS data, it can automatically determine which customer the truck is located at, can access all data associated with that customer, and can associate customer data with the images being transmitted. The data can include the customer's account number, address, previous history, email information, account status, and the like. The system can then immediately begin automated billing of that customer based upon the document, can upload the document to that customer's account (for access by the customer and others), can provide email notifications to the customer right away, and can take other immediate actions based upon the metadata. As another example, codes or information from the shipping document can be automatically determined (e.g., bar codes, OCR or ICR information) to determine which customer the document pertains to, and to then access metadata based upon that information and send or take actions based upon that metadata. One exemplary example would be where the transportation company has issued a range of pro numbers to the customer who is then printing pro numbers and labeling the freight. When the transportation company reads the pro number, they can detect that it is assigned to a specific shipper such as Acme with Account Number ACM123 and then associate this data with the shipment to aid in processing.

Load plan data, unload manifests, advance loading manifests and the like can be automatically generated right away, rather than having to wait for a clerk to review the image and determine what customer it is associated with and manually enter the data.

In some embodiments, trailers and dollies are fitted with RFID tags or electronic identifiers such that their location is tracked at all times. Trailers shall mean any load of a vehicle including trailers, dollies, boxcars, etc. Vehicles shall mean any type of transportation vehicle utilized in the shipping and/or delivery business such as tractors, trucks, vans, flatbeds, box trucks and the like. Thus, for example, the mobile data terminal can determine what trailer is hooked to the tractor and then can track the miles that the trailer is in use by receiving odometer readings from the tractor and calculating the amount of mileage the trailer travels. Also, the trailer's location can be determined by the system at all times, as the mobile data terminal system can transmit data to the remote data center regarding which trailer is connected to the tractor. As one alternative, the hitch of the tractor can be fitted with a sensor or other device to determine which trailer is mated to it.

In March 2001, regulations in the United States were enacted requiring tractor and trailer manufacturers to identify on a driver's dashboard any faults in the anti-lock braking system (ABS) without the use of additional cables. One typical method to implement this regulation was SAEJ2497, also known as PLC4Trucks or more generically PLC Bus. This method allows data to be transmitted over the power line cable connected between the tractor and trailer (PLC-power line communication).

In one exemplary embodiment, a wireless interface/gateway is utilized by the mobile data terminal (onboard computer) to connect to the J1708/J1939 bus on the tractor. A PLC Bus to J1708 Adapter (e.g., a PLC Bus to J1708 Bus Adapter from Hegemon Electronics) can be utilized to connect signals from the PLC Bus to the J1708/J1939 Bus. In one embodiment, programmable ID Tags (such as from Hegemon Electronics or Imarda) can be programmed with unique IDs and installed on trailers and dollies. The ID Tag then communicates via the J2497 PLC4Trucks Bus to the PLC Interface. In another embodiment, the programmable ID Tags may communicate to the J1708/J1939 Interface via a wireless communication link.

In another exemplary embodiment, the J1708/J1939 interface connecting the J1708 bus to the mobile data terminal (for example the R&L Mobile Data Terminal), may comprise additional components and/or functionality such as a wireless communication interface, USB port, serial communication port, accelerometer, Global Positioning Satellite (GPS) receiver, and GSM data communications.

In some embodiments, the mobile data terminal communicates with the anti-lock braking system (ABS) electronic control units (ECU) of the tractor, trailers and dollies. When a tractor is connected to a trailer or dolly, the ABS ECU announce their presence by sending a broadcast message on the PLC4Trucks bus. The mobile data terminal in the tractor listens for these ABS ECU broadcast messages to detect that a trailer or dolly has been hooked to the tractor. The mobile data terminal then communicates with the ABS ECU to retrieve the unique ID of the ABS ECU which can be cross referenced to the Trailer or Dolly ID Number. Thus, for example, the mobile data terminal can determine what trailer is hooked to the truck and then can track the miles that the trailer is in use by receiving odometer readings from the tractor and calculating the amount of mileage the trailer travels. Also, the trailer's location can be determined by the system at all times, using GPS or other technology as the mobile data terminal can transmit data to a remote data center regarding which trailer and/or dolly is connected to the trailer. Another exemplary embodiment involves the ABS ECU being programmed with the trailer or dolly unit number which can be retrieved by the mobile data terminal eliminating the need to cross reference the unique ABS ECU ID (i.e. serial number).

FIG. 1 illustrates a bill of lading transmission and processing system for less-than-truckload (LTL) carriers that can be utilized in accordance with aspects of the present invention. The bill of lading transmitting and processing system 10 comprises scanning a document using a scanning/input system 20, initiating a document transmission using a communication system (transmitter) 30, establishing a connection using a communications link 40, receiving a document using a communications system (receiver) 50, extracting the load planning and billing information 60 from a transmitted electronic bill of lading or delivery receipt or other shipping document, transmitting or sharing the load planning information with a load planner or load planning software 70, and transmitting or sharing the billing information extracted from the electronic bill of lading with a billing or accounting software package 90. The illustrated system is designed so that a truck driver, while en route, can transmit a bill of lading, delivery receipts or other documents received from a customer to a central processing location where the billing and load planning information is extracted and used.

The document scanning/input system 20 can take many different forms. One exemplary method and system comprises a portable scanner connected to a notebook computer. This computer is capable of being interfaced with the communication system (transmitter) 30 selected by the user. Alternatively, a portable fax machine capable of being either directly or through an interface circuit connected to a variety of communications systems including but not limited to cellular telephones, radio links, satellite communication systems and standard telephone systems. If a scanner connected to a personal computer system is used, the computer can include the appropriate software as well as the appropriate PCMCIA/PC Card/ExpressCard or a built in interface for connection to any of the above communication systems (transmitter) 30. As an alternative to using a full notebook computer, a personal digital assistant (PDA) may be utilized if it has the appropriate interface capability between the scanner and the communication system 30 selected. Additionally, if customers agree to use a standard electronic form for a bill of lading or other shipping document, the form could be given to the driver on disk and then transmitted directly without the need for scanning. In an alternative embodiment, the bill of lading or other shipping document may be encoded as a bar code or similar 2D technology and scanned and then transmitted. Furthermore, a PDA or personal computer could be programmed with an electronic form that the customer could fill out and sign while the driver was loading the shipment. After review and verification by the driver, the PDA or computer would then transmit the electronic form to the communication system. Thus, it can be readily seen that the document scanning/input system can be produced as a single unit or may be made up of several independent systems connected together.

The document communication system (transmitter) 30 and document communication system (receiver) 50 are comprised of similar equipment, such that both a transmitting device and a sending device will include a compatible software to interface with one another through transmission protocols such as TCP/IP, or any other transmission protocols. This communications equipment can be a stand alone system or can be provided as part of an integrated package with the document scanning or input system 20. One exemplary embodiment comprises using separate systems so that the communication systems could be upgraded or changed as technology and the trucking company requirements change. Examples of communication systems that could easily be used to transmit a signal which contains the information from the bill of lading are the following broad categories: analogue telephones; digital telephones; high frequency (HF), very high frequency (VHF), or ultra-high frequency (UHF) radio transmitters; cellular telephone; or satellite communication systems; IEEE 802.11 WiFi, IEEE 802.16 WiMAX or other future wireless communication protocols. The distance over which the communications link 40 must be reliable will determine which communication system is selected by a specific user. For short distances (line of sight), cellular telephone and VHF/UHF radio links can be utilized. Medium distance transmission (line of sight to 100 miles) would typically use cellular telephones if available or HF radio links. HF radio is the least preferred communication system due to signal propagation problems. Long distance communications could use cellular telephone if available or satellite communication systems.

In one exemplary embodiment, the system is configured to utilize the least cost based communication system that is available at the time a message or data needs to be transmitted. For example, each type of message or data may be assigned a pre-determined maximum communication cost under which it could be utilized. Based on the importance of the message or data to be sent, that individual maximum may allow all technologies since it is warranted whereas other massages may be queued until cellular or other lower cost coverage is obtained or alternatively until a time threshold is reached.

The use of standard or plain old telephone systems (POTS) communication circuits could be accessed using an acoustic coupler and a modem so that a standard telephone handset could be utilized. If it is not necessary to utilize a standard telephone handset, then just a modem with a direct connection to the telephone system would be utilized. To utilize any of the HF, VHF or UHF radio systems, a radio frequency modem would be required to be a part of the communication or communication system 30 or 50. To use cellular technology in either an analogue cellular phone or a digital cellular phone, the appropriate cabling and modems would also be required to be part of the communication systems 30 or 50.

There is a fairly broad spectrum of satellite communication systems presently available and a host of satellite communication systems that are being developed or implemented that could be utilized in the future. All of these systems will require the use of some type of radio transceiver and antenna assembly for communicating between the satellite and the truck. Depending upon the type of satellite communication equipment utilized, a radio frequency (RF) modem or some other interface may be required to be a part of the communication systems 30, 50 in order for the digital information generated by the document scanning/input system 20 to be converted into a radio signal for transmission to the satellite. Additionally, some trucks already use a satellite communication system to track the vehicle's location and communicate with the driver. If such a system is already installed the document scanning/input system 20 could interface directly with the installed equipment.

Communication link 40 can comprise any system or method of transmitting the information from the communication system transmitter 30 to communication system receiver 50. These systems and methods include: 1) standard phones lines; 2) a combination of radio and telephone circuits, as used in a cellular telephone system; 3) a direct radio circuit, which would be employed in a situation using an HF, VHF or UHF radio link; 4) WiFi and/or WiMAX; 5) a combination of VHF or UHF radio link to a satellite with a return VHF, UHF link to a ground station, the ground station would link to a central processing facility over a telephone line, alternatively the ground station and telephone line could be replaced by a second radio link directly to the central processing facility, depending on how the satellite communication system was designed to be used.

In order to maximize the efficiency of the bill of lading transmission and processing system, the electronic bill of lading, received at the central processing facility for the trucking company is processed to extract the load planning and billing information 60. To extract this information, the electronic bill of lading received by the document communication system 50 would be processed to remove the applicable information from the electronic bill of lading and transmit the required information to either the load planner 70 or to the billing and accounting software package 90.

One method of extracting load planning and billing information would be to interface the document communication system 50 with a standard personal computer using the appropriate modem or interface box. The electronic bill of lading would be digitized and then processed with an optical character recognition (OCR) or intelligent character recognition (ICR) software package. The character based electronic bill of lading provided by the OCR program is then used in the load planning and billing processes. The load planning information would preferably then be transmitted to the load planner over a local area network. This information could be printed and/or displayed at the load planner's terminal. As an additional time saver the load planning information 70 could be transmitted to a computer running on the local area network. This computer would run a load planning software package which would do the load consolidation and planning automatically.

The billing information extracted would be transmitted or inputted into a standard billing and accounting software package which could automatically invoice the shipper so that there would be a shorter time period between picking up a load and billing the shipper. Additionally, the load planning information extracted could be transmitted or input into a load planning software package that could automatically build a shipping and loading plan to minimize partial loads and keep the shipments on time. An additional value of having the load planning and billing information automatically extracted from the electronic bill of lading is expected that fewer errors in load planning and billing would be made. In practice, this system can range from a fully automatic, electronic, paper less system to one which relies on paper and uses the system merely as a transmission device.

Figure 2:
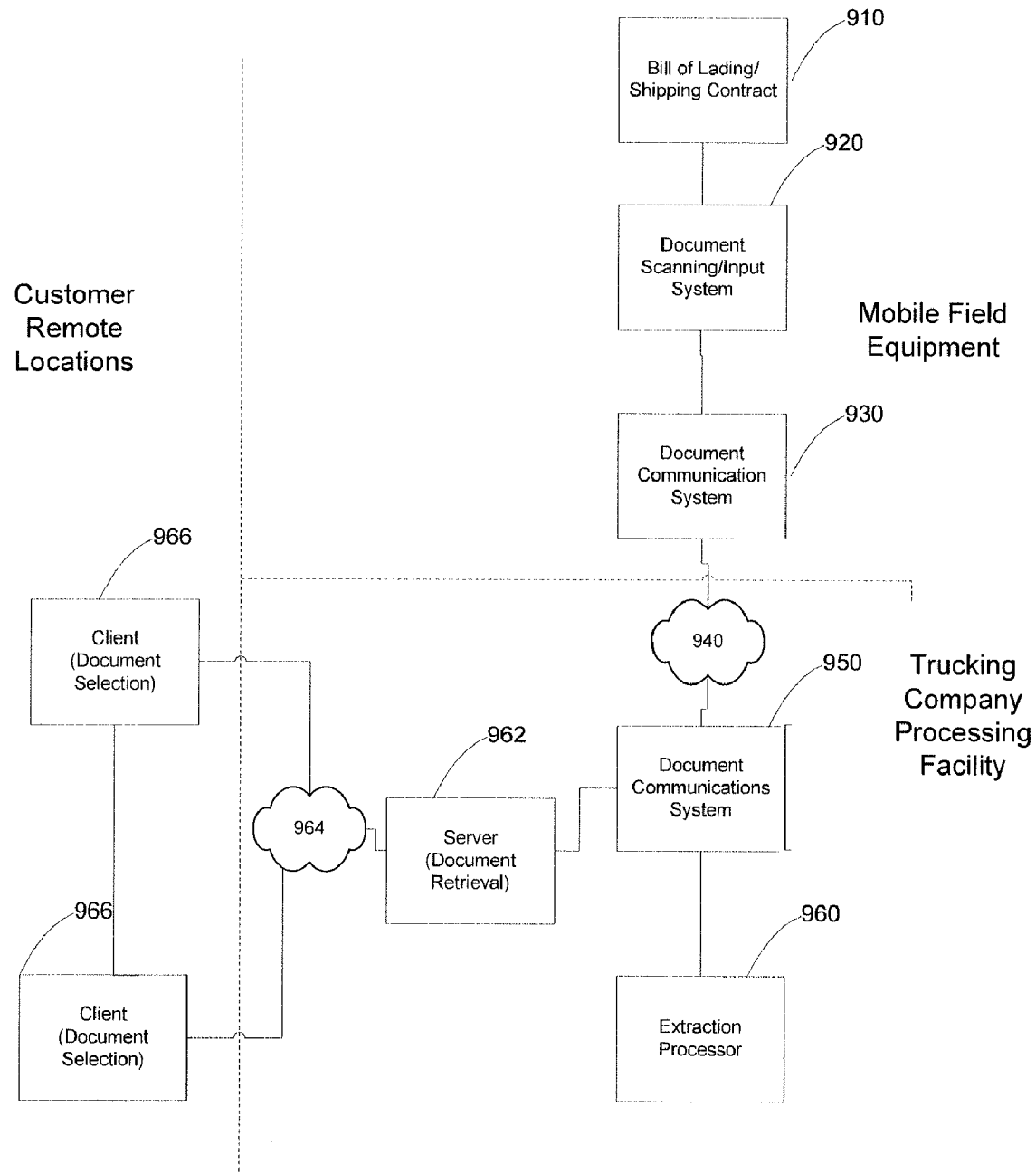
FIG. 2 is a block diagram of an alternate embodiment of a system for load planning and billing that may be utilized with embodiments of the present invention.

FIG. 2 is a block diagram of an alternate embodiment of a system for load planning and billing, similar to that shown in FIG. 1. In particular, a document scanning/input system 920, such as one that includes a portable scanner for example, is interfaced with the transmitter 930, which provides the document 910 to the receiver 950 via the communication link 940.

The electronic bill of lading, received at the central processing facility for the trucking company by using the receiver 950, can be processed to extract the load planning and billing information, to transmit the appropriate information to the load planner, and/or to the billing and accounting software package. In particular, an extraction processor 960 can be provided to extract this information from the electronic bill of lading. As discussed above, one method of extracting load planning and billing information would be to interface the document communication system 950 with an extraction processor in the form of a standard personal computer using the appropriate modem or interface. The electronic bill of lading could be digitized and then processed with an optical character recognition (OCR) or intelligent character recognition (ICR) software package. The character based electronic bill of lading provided by the OCR program can then used in the load planning and billing processes. A second method of extracting the load planning and billing information would be for a data entry clerk to view either a paper or electronic copy of the electronic bill of lading and manually enter the appropriate data into a computer system for load planning, billing, and accounting. If a computerized load planning system was not utilized, a paper copy of the electronic bill of lading would be printed and given to the load planner. The billing information extracted would then be transmitted or inputted into a standard billing and accounting software package which could automatically invoice the shipper so that there would be a shorter time period between picking up a load and billing the shipper. Additionally, the load planning information extracted could be transmitted or input into a load planning software package that could automatically build a shipping and loading plan to minimize partial loads and keep the shipments on time.

The electronic bill of lading, received at the central processing facility for the trucking company by using the receiver 950, can be processed to extract the load planning and billing information, to transmit the appropriate information to the load planner, and/or to the billing and accounting software package. In particular, an extraction processor 960 can be provided to extract this information from the electronic bill of lading. As discussed above, one method of extracting load planning and billing information would be to interface the document communication system 950 with an extraction processor in the form of a standard personal computer using the appropriate modem or interface. The electronic bill of lading could be digitized and then processed with an optical character recognition (OCR) or intelligent character recognition (ICR) software package. The character based electronic bill of lading provided by the OCR program can then be used in the load planning and billing processes. A second method of extracting the load planning and billing information would be for a data entry clerk to view either a paper or electronic copy of the electronic bill of lading and manually enter the appropriate data into a computer system for load planning, billing, and accounting. If a computerized load planning system was not utilized, a paper copy of the electronic bill of lading would be printed and given to the load planner. The billing information extracted would then be transmitted or inputted into a standard billing and accounting software package which could automatically invoice the shipper so that there would be a shorter time period between picking up a load and billing the shipper. Additionally, the load planning information extracted could be transmitted or input into a load planning software package that could automatically build a shipping and loading plan to minimize partial loads and keep the shipments on time.

In one exemplary embodiment, the Internet may be utilized as the communication link 964, if desired, for allowing access by customers to the shipping documents. As an example, the server 962 could comprise a web server that allows for retrieval of the shipping documents that have been remotely transmitted from the driver, and that allows for posting or otherwise providing these shipping documents via a webpage or website. The client devices 966 could comprise computers or handheld devices that include web browser hardware and software that can communicate with the server 962 for accessing the shipping documents. For instance, when the customer connects to the server 962 via the internet using the client device 966, a web browser running on the client device 966 could ask the customer to type in the keyword for the desired document and click on the appropriate button. The web site software on the server 962 could then receive the request and connect to an Imaging database where the shipping documents are stored. The server software could then perform a query for that document keyword. Once the document is found, it can then be copied to the web server 962 and converted to JPEG, or another suitable format, and displayed to the user via the web connection 964 and the web browser software on the client 966. The software running on the client 966 may allow the user to zoom in or out, rotate, save a document, or view another document.

Additional details regarding systems with which embodiments of the present invention can be used can be found in U.S. Patent Application Publication No. 20020103728, and in U.S. Pat. No. 6,401,078, the entire disclosures of which are hereby incorporated by reference herein.

Figure 3:
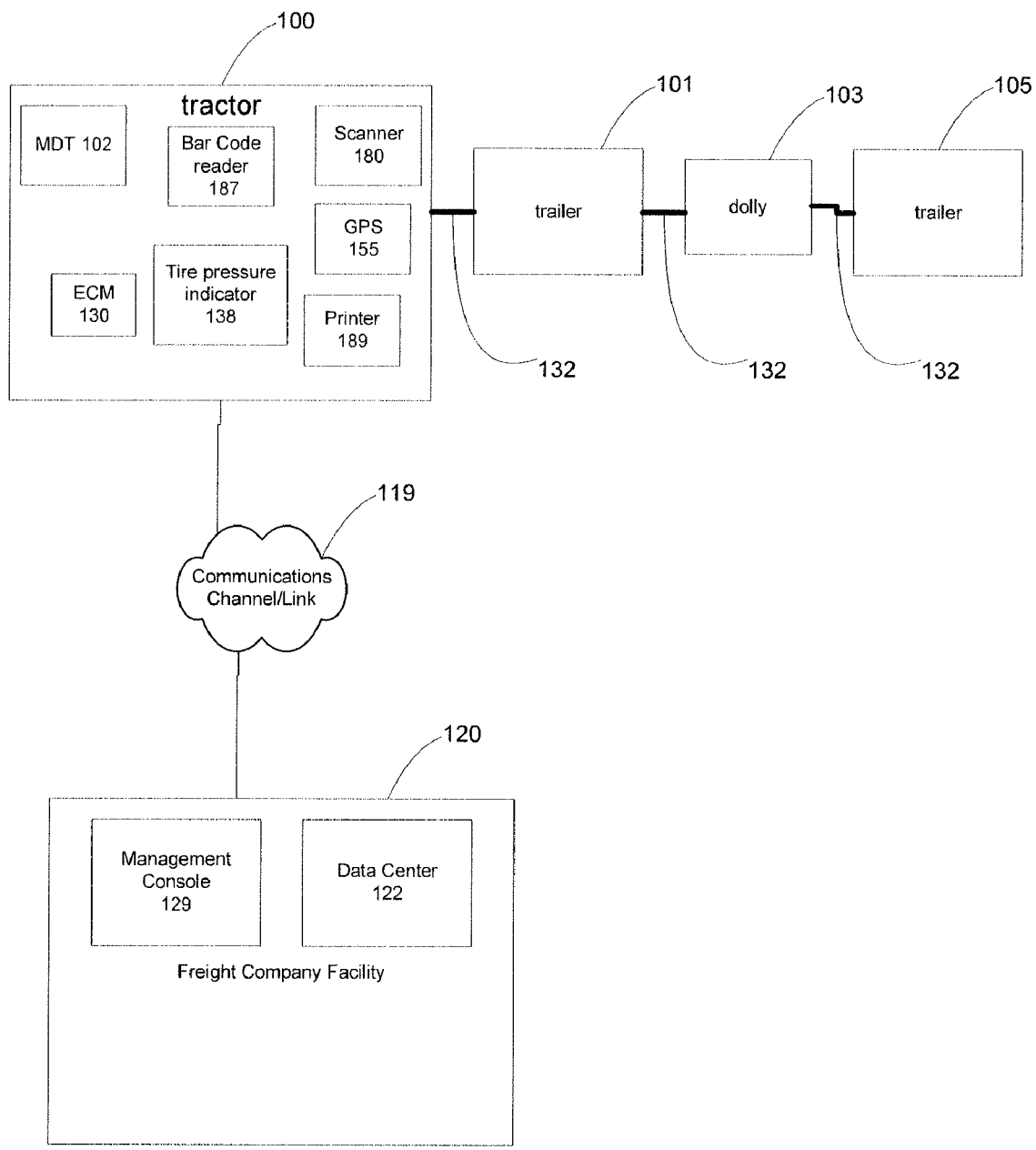
FIG. 3 is a block diagram of one embodiment of an information transmission and processing system for freight carriers.
Figure 4:
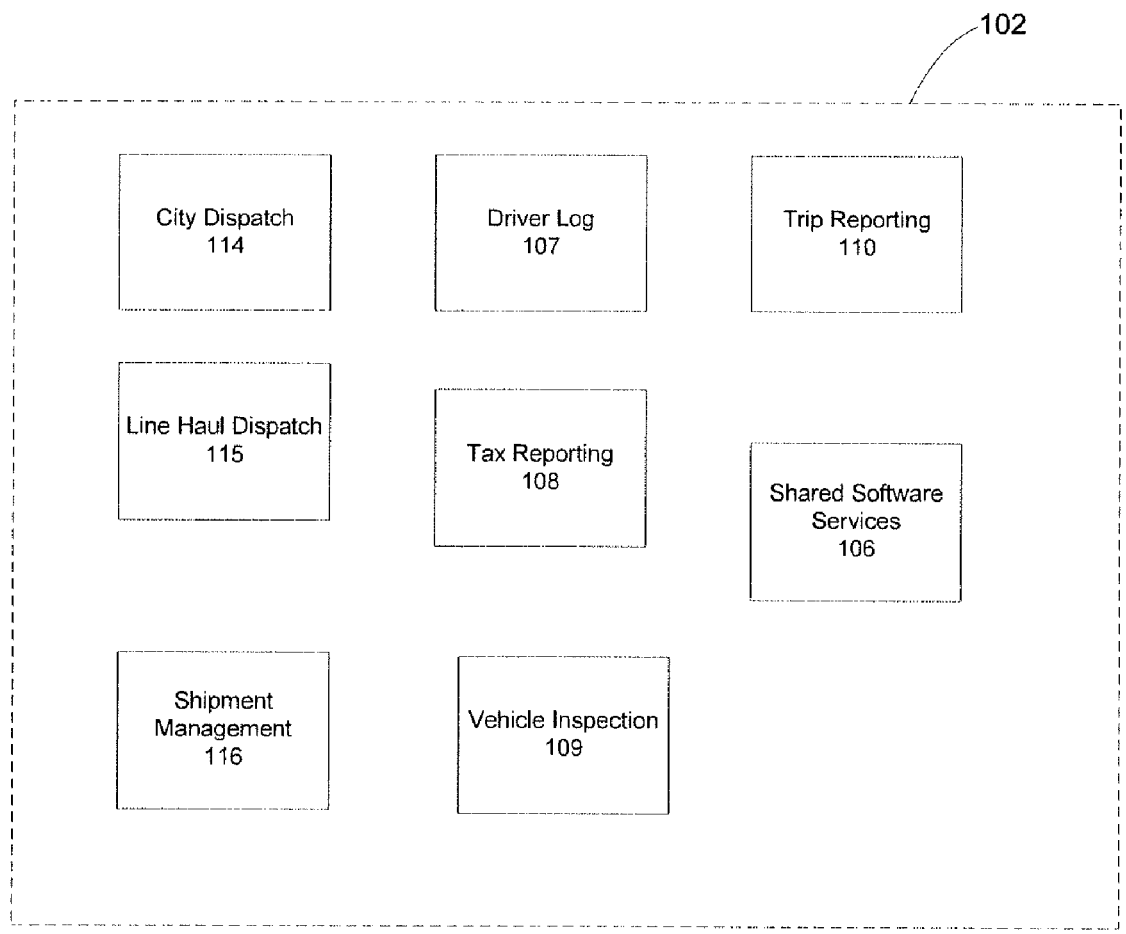
FIG. 4 is a block diagram of an exemplary mobile data terminal of the present invention.

FIG. 3 is a block diagram of an illustrative embodiment where a tractor 100 is connected to a trailer 101, dolly 103, and trailer 105 and is in communication with a freight company facility building 120 via a wireless communication channel 119, such as described above. The tractor 100 includes a mobile data terminal 102. As illustrated in FIG. 4, the mobile data terminal 102 may include a number of in cab software applications, including a city dispatch application 114, a shipment management application 116, a line haul dispatch application 115, a driver log application 107, a tax reporting application 108, and a vehicle inspection 109 and trip reporting application 110.

The City Dispatch Application 114 tracks shipment deliveries and pickups. The City Dispatch Application running on the Mobile Data Terminal 102 provides the driver with visibility to his delivery and pickup assignments. It can validate that the driver has selected the proper tractor and trailer by comparing equipment ids electronically with what was assigned to the driver for his route. In addition it allows communication between the driver and dispatch or terminal staff. It can provide directions to get to a specific destination taking into account current driver location.

The City Dispatch Application 114 tracks shipment deliveries and pickups. The City Dispatch Application running on the Mobile Data Terminal 102 provides the driver with visibility to his delivery and pickup assignments. It can validate that the driver has selected the proper tractor and trailer by comparing equipment IDs electronically with what was assigned to the driver for his route. In addition it allows communication between the driver and dispatch or terminal staff. It can provide directions to get to a specific destination taking into account current driver location.

The Shipment Management Application 116 tracks and manages all shipments. When a shipment is delivered the shipment management application will capture the event and provide a current order status. When a shipment is picked up it can capture shipment information to provide immediate visibility to operations personnel.

The Driver Log Application 107 allows the driver to prepare driver log documentation electronically to streamline processing and comply with government regulations. The Driver Log Application 107 may be further configured to comprise a driver compliance module in which sensors detect seat belt and lights usage, hard cornering, speeding and the like. The sensors may also be coupled to the electronic control module (ECM) such that the ECM may provide output signals based on the signals provided by the sensors. The Mobile Data Terminal 102 may then provide warnings to a driver when an infraction occurs, or it may report infractions to the remote processor.

The Tax Reporting Application 108 tracks vehicle travel capturing miles traveled per state, miles traveled along toll roads or national highway miles traveled, for example, to allow reporting of various mileage based taxes imposed by government authorities.

The Vehicle Inspection Application 109 is used by the driver to perform a structured inspection of the vehicle prior to leaving the terminal and capture the results electronically. Key inspection points may be coded using bar codes or other means to allow easy input. Additionally, the Vehicle Inspection Application may be configured to utilize sensors throughout the vehicle to monitor vehicle performance factors such as tire pressure, battery charge, engine temperature and the like. The Mobile Data Terminal may then transmit the performance factors to the remote processor.

The Trip Reporting Application 110 is used by the driver to capture specifics of their route and capture the results electronically.

The mobile data terminal 102 can include input devices (touchscreen, buttons, wheels, dials, voice recognition) as well one or more processors, I/O interface circuitry, and one or more displays. For example, Audio Output possibility to alert driver to messages, turn by turn directions, etc.

In one further embodiment, a tire pressure interface 138 is also utilized to maintain and track the tractor tire pressure and to transmit this to the mobile data terminal 102. Accordingly, the data terminal can provide warnings and messages when incorrect tire pressure is present. In addition, a GPS unit 155 provides location information to the terminal 102. Additionally, the trailers (101 & 105) and dolly (103) are provided with ID Tags (e.g. RFID, PLC Interface) which communicate via the tracking interface 132 to track which assets are attached to the tractor.

Additionally, shared software services 106 reside on the mobile data terminal 102, and these services can provide text and voice and data communications (to communicate wirelessly), GPS and geofencing services (to determine the location of the tractor 100 and to provide information according to that location), in the field over the air firmware update services (to update the unit 102), engine control module integration services (to integrate with information from the vehicles engine control module), and peripheral integration services (to allow the unit to interface with devices such as scanners, printers 189, memory cards, door sensors and the like).

A document scanner, imager or camera 180, is incorporated in the system to scan the shipping documents, such as a the bills of lading, delivery receipts, and customs paperwork. The scanner 180 works with the processing hardware and software in the mobile data terminal unit 102 to render an image of the document, such as via document scanning or imaging techniques. In a further embodiment, a bar code reader 187 is incorporated into the mobile data terminal 102 or in communication with the mobile data terminal 102. The bar code reader 187 allows the driver to scan labels or stickers on shipments and associated documents such as pro numbers as to further enhance the tracking of each individual unit of a shipment that is loaded onto the trailer. An ECM 130 provides information about the engine and the vehicle to the mobile data terminal 102. The trailer 101, dolly 103 and trailer 105 each include asset tracking ID hardware and software to allow the mobile data terminal 102 to realize what is attached to the tractor 100 and to record information about those assets, such as how far they have traveled, and their conditions.

Figure 5:
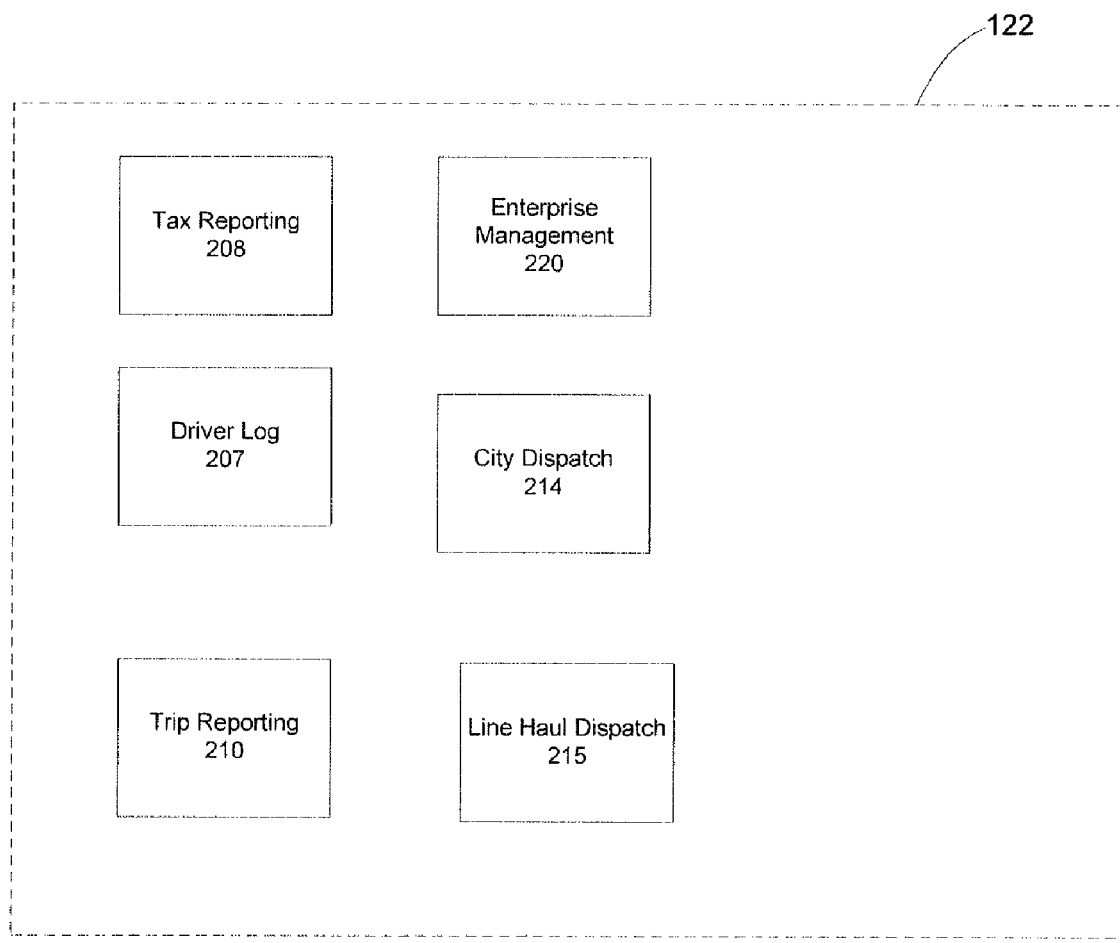
FIG. 5 is a block diagram of an exemplary remote data center of the present invention.

The freight company facility 120 includes a data center 122 and a management console 129 for wireless communication with the terminal 102 and other terminals of other tractors in the field. The data center may comprise one or more software services such as tax reporting, driver logs, trip reporting, and enterprise asset management, and city dispatch and line haul dispatch software services. as illustrated in FIG. 5.

The Tax Reporting Application 208 utilizes the data captured by the application running on mobile data terminal combined with data from fuel management systems in use at the terminal that track fuel disbursements along with on the road fuel purchases to prepare compliant mile and fuel based reports for submission to the appropriate government authority.

The Driver Logs Application 207 utilizes the data captured by the application running on the mobile data terminal to track driver status. Terminal staff can monitor compliance with Hours of Service regulations in an exception based manner.

The Trip Reporting Application 210 consolidates and makes available the data entered by the driver in an electronic manner to terminal staff.

The Enterprise Asset Management Application 220 uses data captured by the Mobile Data Terminal to automate tracking of transportation units, which may include tractors, dollies and trailers, for example. These updates are based upon using GPS data and geofences to detect when units enter and leave points of interest. Points of interest may include, but are not limited to, terminals, slip points, customers, routes and waypoints. In addition mileage for tractors, dollies and trailers can be updated using data from the ECM interface 130. The ECM Interface 130 can also provide engine fault code information to allow earlier detection of problems and predictive maintenance.

The City Dispatch Application 214 allows terminal staff to plan delivery and pickup routes, dispatch drivers on a route with specific equipment, capture customer shipment pickup requests, communicate delivery and pickup assignments to drivers via the mobile data terminal, track driver progress, calculate estimated time of delivery or pickup and communicate with the driver.

The Line Haul Dispatch Application 215 allows terminal staff to manage line haul schedules, dispatch drivers on a line haul route with specific equipment, and communicate with the driver.

Figure 6A:
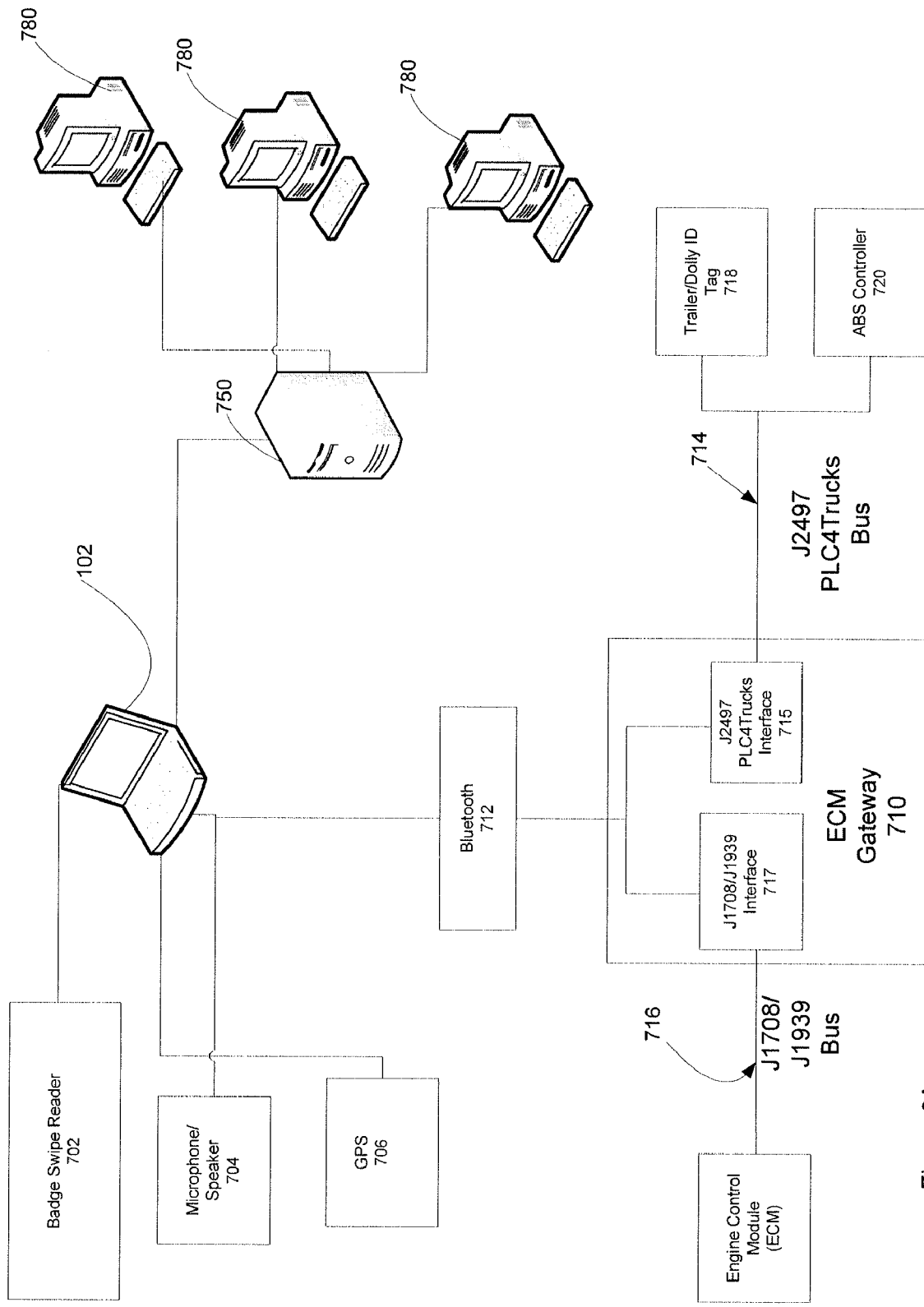
FIG. 6A is a block diagram of a load planning and billing system setup that may be utilized with embodiments of the present invention.

Another exemplary system of the present invention is illustrated in FIG. 6A. In this exemplary embodiment, the mobile data terminal 102 includes a driver identification device such as an ID Badge reader 702. In addition, the mobile data terminal 102 includes a microphone and speaker 704 to provide audio feedback and communication with the driver and a GPS module 706 to provide geofencing and location/speed related functions.

The mobile data system 102 is connected to an Engine control module (ECM) gateway 710. This connection may be via wired or wireless communication, such as Bluetooth 712 or any other communication method/technology. Exemplary wireless connections include RF, Bluetooth, 802.1x and other wireless protocols. Exemplary wired connections include RS232 Serial and USB protocols. The ECM Interface 710 consists of both a J1708/J1939 Interface 717 and a J2497 PLC4Trucks Interface 715. The ECM Interface 710 may comprise one or multiple devices. The ECM Interface 710 may be capable of communicating via the J1708 protocol or the J1939 protocol. The ECM Interface 710 (commercially available from Imarda (V300)) provides the mobile data system 102 a native interface to both the J1708/J1939 ECM Bus 716 and the J2497 PLC4Trucks Bus 714.

Figure 6B:
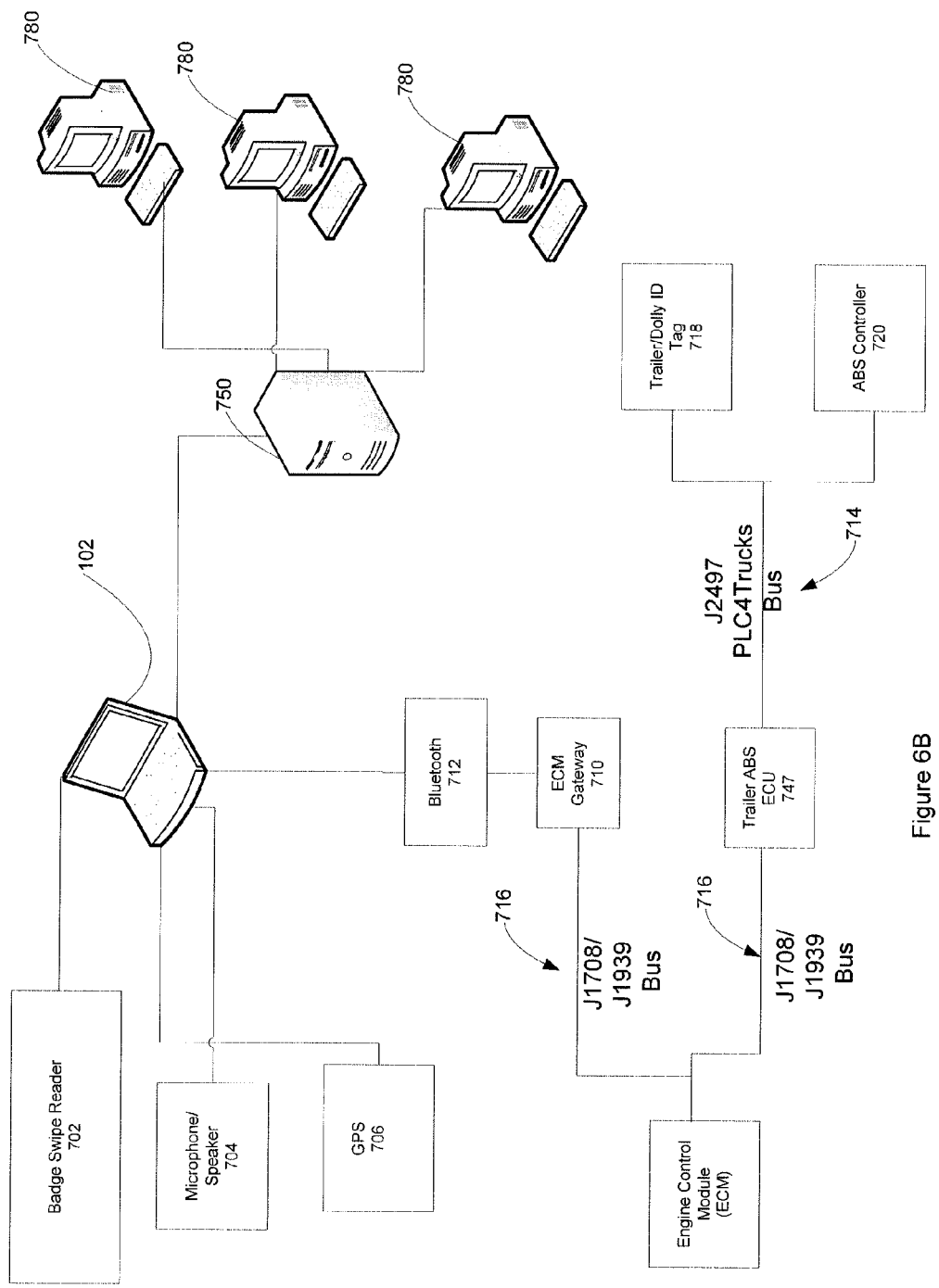
FIG. 6B is a block diagram of a load planning and billing system setup that may be utilized with embodiments of the present invention.
Figure 7:
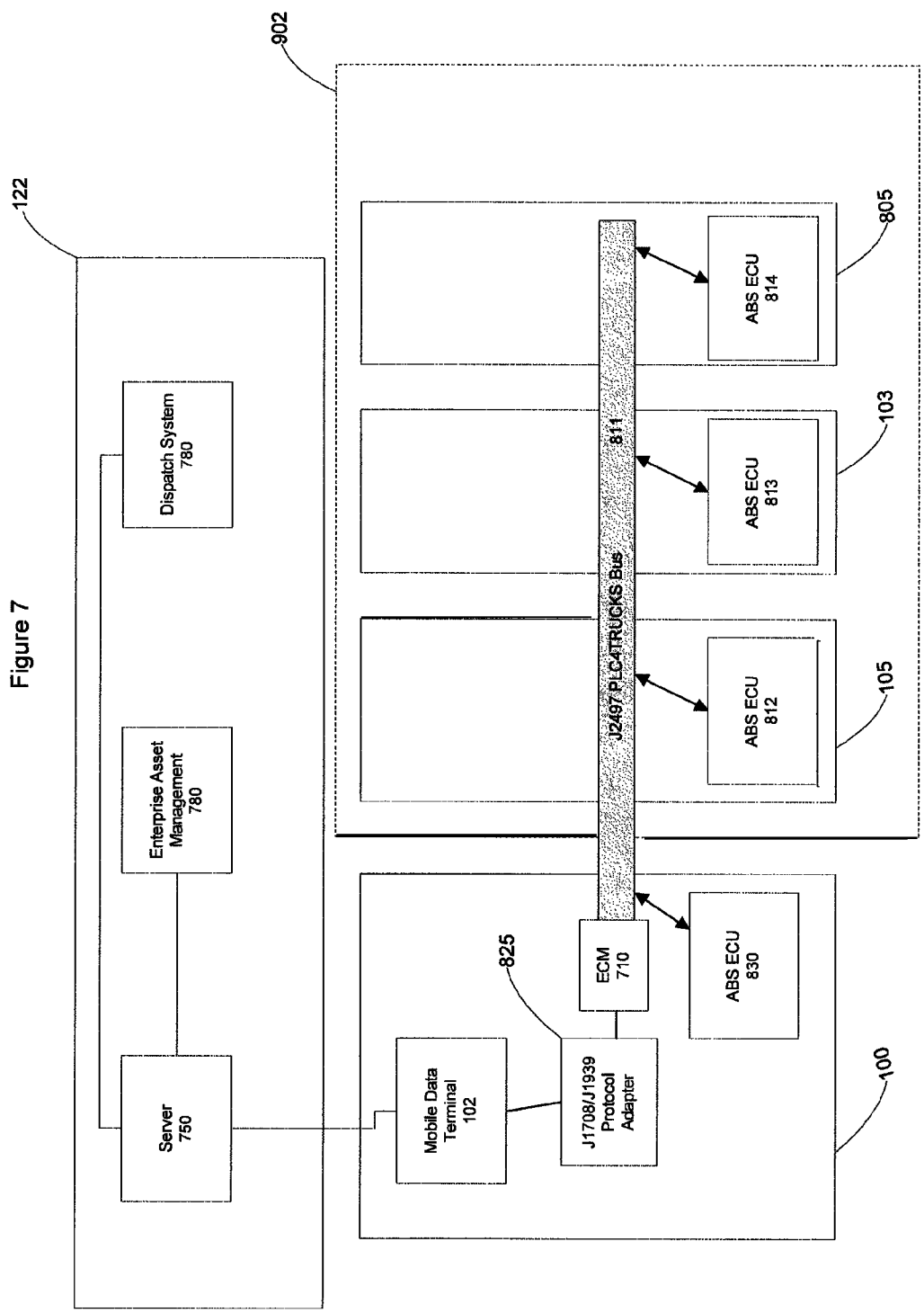
FIG. 7 is an illustration of an exemplary embodiment of the present invention.

In another embodiment (FIG. 6B), the PLC4Trucks Bus 714 may not communicate directly with the ECM Interface 710, instead leveraging the integration between the Tractor ABS Electronic Control Unit (ECU) 747 and Engine ECM. This allows the Mobile Data Terminal 102 to indirectly communicate with the PLC4Trucks Bus 714 via the J1708/J1939 Bus 716. One exemplary Tractor ABS ECU 747 of the particular embodiment is the WABCO ABS tractor unit 'TYPE-E'. For example, when connected to a WABCO Easy Stop Trailer ABS module, a unique identifier on the Trailer/Dolly ABS Controller can be used to infer the trailer ID. Typically, any tractor with such an ABS system naturally acts as a gateway between the tractor and the trailers and dollies. For tractors that do not come so equipped, another exemplary PLC4Trucks Interface 747 is the Hegemon PLC Reader which is a J2497 to J1708 Protocol converter.

The J2497 PLC4Trucks Bus 714 is typically utilized to provide Power Line Communications to various devices on the tractor, trailers and dollies. In one exemplary embodiment, a tractor/dolly ID tag 718 is connected to the PLC4Trucks Bus and provides a unique ID for the corresponding equipment. In another embodiment, the ABS controller 720 is utilized as disclosed further herein to generate a unique ID specific to the corresponding equipment.

The mobile data terminal 102 is configured to communicate with a remote server 750 in a data center. This communication can be via both wired and wireless technologies as described further herein. The remote server may be in communication with one or more additional servers and/or systems 780.

The trailer and dolly tracking subsystem detects when a dolly or trailer has been attached or detached to the tractor. This may utilize wireless or wired communication. Wired communication provides instant confirmation that the trailer or dolly has been attached while wireless may require additional processing to confirm due to nearby trailers or dollies being detected even though they are not attached. The trailer and dolly tracking subsystem can then generate an event to the Mobile Data Terminal 102 signifying that a trailer or dolly has been attached. The mobile data terminal 102 can then use an interface to capture current tractor mileage and location and then communicate it to the remote server and/or enterprise asset management system to update equipment status. When the trailer and dolly tracking subsystem detects that the equipment has been unhooked it can capture current tractor mileage and location. By comparing current mileage and previous mileage it can be determined how many miles the equipment has traveled and the enterprise asset management application can be updated to allow immediate visibility to equipment in need of preventive maintenance. In another embodiment, the ABS ECU may be capable of monitoring odometer or mileage) internally. These embodiments eliminate the need to manually capture mileages from equipment at the terminals.

The trailer and dolly tracking subsystem detects when a dolly or trailer has been attached or detached to the tractor. This may utilize wireless or wired communication. Wired communication provides instant confirmation that the trailer or dolly has been attached while wireless may require additional processing to confirm due to nearby trailers or dollies being detected even though they are not attached. The trailer and dolly tracking subsystem can then generate an event to the Mobile Data Terminal 102 signifying that a trailer or dolly has been attached. The mobile data terminal 102 can then use an interface to capture current tractor mileage and location and then communicate it to the remote server and/or enterprise asset management system to update equipment status. When the trailer and dolly tracking subsystem detects that the equipment has been unhooked it can capture current tractor mileage and location. By comparing current mileage and previous mileage it can be determined how many miles the equipment has traveled and the enterprise asset management application can be updated to allow immediate visibility to equipment in need of preventive maintenance. In another embodiment, the ABS ECU may be capable of monitoring odometer or mileage internally. These embodiments eliminate the need to manually capture mileages from equipment at the terminals.

In one exemplary embodiment, at the time of hookup between the tractor 100 and trailer 105 and/or dolly 103, the on-board computer 102 captures key information to be associated with the hook event such as tractor mileage and location. The on-board computer 102 transmits the event information to a remote server 750 at the data center 122. The server 750 can then update enterprise systems 780 (such as an enterprise asset management system) with the trailer/dolly hook event providing asset visibility. In one further embodiment, the server 750 updates a dispatch system 780 which records and validates the equipment pairing against dispatcher out bounding actions.

In one embodiment, the ABS ECUs (812, 813, 814) continue to broadcast their presence on a recurring or pre-determined basis. The on-board computer 102 can monitor this broadcast or lack of a broadcast to determine if there is a missed broadcast. A missed broadcast can indicate that the trailer 105 or 805 or dolly 103 has been unhooked. The on-board computer 102 can verify by attempting to communicate with the particular ABS ECU. If the ABS ECU does not respond, then a trailer/dolly unhook event is generated. In one embodiment, at the time of the unhook event, the on-board computer 102 captures additional information such as tractor mileage and location. This ending mileage can be compared with the starting mileage to create a "virtual odometer" which is particularly useful for assets that do not have the inherent ability to track mileage.

The on-board computer periodically monitors the ABS status signals. In one exemplary embodiment, if the ABS status signal is not recorded for a predetermined time period, the on-board computer will consider the trailer potentially unhooked and may initiate a confirmation communication sequence. Exemplary time periods range from five seconds to five minutes, one exemplary time period is 25 seconds. If the on-board computer determines that the ABS module is no longer connected, it records associated data (i.e., mileage and location) and this data can then be transmitted to the remote server.

The unhook event is transmitted to the remote server 750 at the data center 122. This can occur immediately or when the tractor reaches a distribution hub. In addition, this transmission may occur synchronously or asynchronously. For example, if the mobile data terminal does not have a communication link available to the remote server (i.e. no cellular service available), the transmission may occur when the communication link is reestablished. The server 750 can then update other enterprise systems 780 (i.e., enterprise asset management system, dispatch system, etc.) with the unhook event information.

The exemplary embodiment utilizing the ABS ECUs eliminates the need to install an additional device on each tractor, trailer and dolly to be utilized as a unique ID for tracking purposes (i.e., RFID, etc.). In addition, by utilizing existing hardware present on the tractor, trailers and dollies, a significant cost and time savings as well as rapid deployment can be enjoyed. The ABS ECU embodiment also allows other (i.e., different fleet) equipment (trailers/dollies) to be tracked since there is no requirement for a fleet specific ID tag.

Another advantage of the present invention is that any device on the trailer or dolly that utilizes the PLC protocol can communicate with the tractor and the on-board computer (i.e., identification tag, ABS ECU, temperature sensor, tire pressure monitoring system, etc Another advantage of the present invention is that any device on the trailer or dolly that utilizes the PLC protocol can communicate with the tractor and the on-board computer (i.e., identification tag, ABS ECU, temperature sensor, tire pressure monitoring system, etc.).

The image is classified in step 500. The image is then routed 510 to one or more locations and then stored 520, One advantage of classification of the image is that the image received can be associated with other images which are relevant to a particular destination or a particular searchable characteristic (e.g. type of item, model of product, and the like). For example, if transportation vehicles 1 and 2 each receive documentation pertaining to packages received while the drivers are performing deliveries, and both vehicle 1 and vehicle 2 are arriving at a loading/unloading destination, the images from each of these transportation vehicles would be associated together by a classification means. In a common scenario, this classification means might use the bar code on the images to identify the trucks sending the images and then to store the images in a directory associated with the destination of these two transportation vehicles. The items or packages might also be classified as to the type of product, color, model number, etc., so that an individual item could be identified and (for example) redirected to an alternate destination while en route. Once the loading information from these images are appropriately extracted or manually keyed from these images, the information is passed to a load planning software package for generation of an advance loading manifest.

Figure 8:
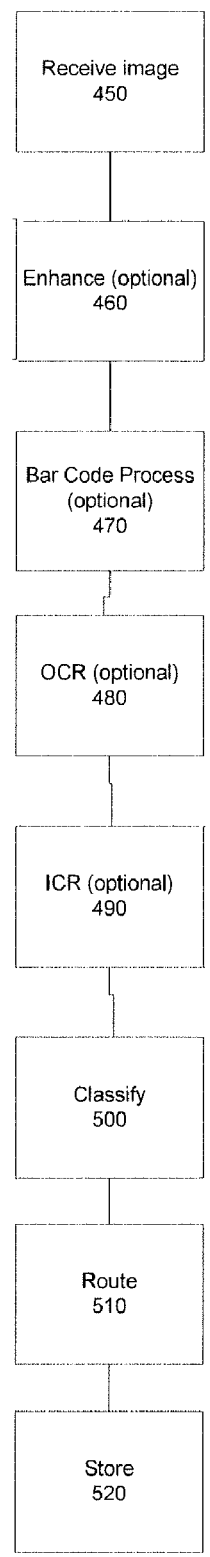
FIG. 8 is a block diagram of an exemplary embodiment of the present invention.
Figure 9:
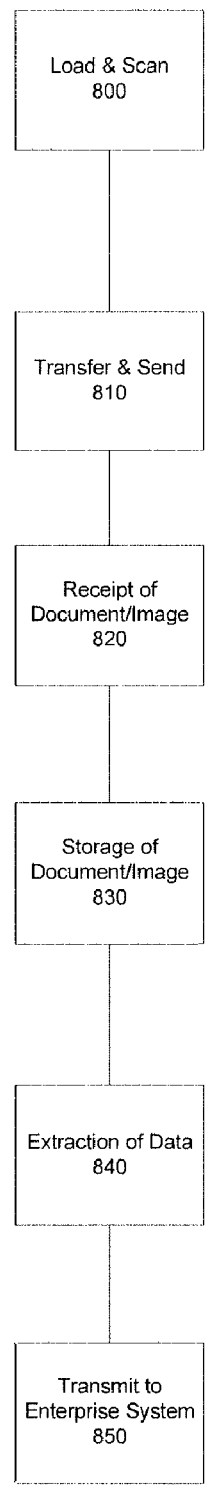
FIG. 9 is a flowchart of an exemplary embodiment of the present invention.

In other exemplary embodiments, some if not all of the processing outlined in FIG. 8 may also occur on the Mobile Data Terminal 102. Image enhancement, Bar Code Detection, Optical Character Recognition (OCR), Intelligent Character Recognition (ICR).

In one exemplary embodiment, the enhancement step 460 may be programmatically enhanced by commercially available software, such as InputAccel™ from EMC Captiva, to provide for better image quality by performing operations such as despeckling, cropping, and improving image brightness. Improved image quality will permit more accurate automatic processing and/or manual keying of the information included on the image.

In one exemplary embodiment, the enhancement step 460 may be programmatically enhanced by commercially available software, such as INPUTACCEL™ from EMC Captiva, to provide for better image quality by performing operations such as despeckling, cropping, and improving image brightness. Improved image quality will permit more accurate automatic processing and/or manual keying of the information included on the image.

INPUTACCEL™ also performs work flow processing of the image by monitoring directories contained on the computing device and identifying images when the images become available in the directories. For example, types of images can be identified by the image file name extension and automatic operations can be performed on the images based on the directory in which they appear and their file names. In this way, the images are programmatically processed upon receipt by the remote processor and the load planning information associated therewith is dynamically available when an advance loading manifest is requested. This automation reduces the amount of personnel required to process loading documentation, reduces errors associated with manual processing, and substantially increases the efficiency of generating advance loading manifest.

In another exemplary embodiment, the date and time of when the document is scanned can be used as a proxy for the actual pickup or delivery time of the shipment. This provide additional data of interest to both the customer and operations without the need for data entry.

In another exemplary embodiment, the date and time of when the document is scanned can be used as a proxy for the actual pickup or delivery time of the shipment. This provides additional data of interest to both the customer and operations without the need for data entry.

In one exemplary embodiment, prior to sending the compressed documentation, the software logic break the documentation into smaller units, or packets. These packets will generally be numbered and the total number of packets recorded as part of the processing. This will permit the computing device used by the driver, to reliably transmit to a remote processing center's computing device. Busting the documentation into smaller packets, which are then sent in Step 810, will also decrease the expense associated with transmitting the documentation should an error in transmission occur, such as loss of communication with a cell tower after 50% of the documentation was sent. Particularly, if an error is encountered, both the computing device used by the driver and the remote processing's computing device will know what packets have been received and what still needs to be received by the remote processor. Initially, the transmission device of the driver's computing device makes contact with the remote processing center's computing device and transmits the total number of packets which are to be sent. As each packet is received, the packet's number is recorded by both the receiving computing device and the sending computing device. With this information, error recovery with failed transmissions can be readily resolved.

In one exemplary embodiment, prior to sending the compressed documentation, the software logic breaks the documentation into smaller units, or packets. These packets will generally be numbered and the total number of packets recorded as part of the processing. This will permit the computing device used by the driver, to reliably transmit to a remote processing center's computing device. Busting the documentation into smaller packets, which are then sent in Step 810, will also decrease the expense associated with transmitting the documentation should an error in transmission occur, such as loss of communication with a cell tower after 50% of the documentation was sent. Particularly, if an error is encountered, both the computing device used by the driver and the remote processing's computing device will know what packets have been received and what still needs to be received by the remote processor. Initially, the transmission device of the driver's computing device makes contact with the remote processing center's computing device and transmits the total number of packets which are to be sent. As each packet is received, the packet's number is recorded by both the receiving computing device and the sending computing device. With this information, error recovery with failed transmissions can be readily resolved.

Thereafter, load plans for a destination, which may include interim and final destinations for a package, can be dynamically preformatted and manipulated by using a computing device to request from the remote processing center's computing device an advance loading manifest. Advance loading manifests, are documents generated by the load planning software discussed above. These documents provide instructions to workers at a destination, informing the workers that a particular package or item needs to be placed on a particular truck for further shipment at a particular time. Since, the load planning software is receiving documentation regarding the packages dynamically throughout delivery day, whenever the load planning software is requested to generate an advance loading manifest, the loading efficiency of the trucks is fully maximized, at that point in time. As will be understood, the inventive system enables dynamic routing of items and packages as they are en route. Optimization of transportation resources, business cycles and delivery times can thereby be accomplished on a dynamic and real time basis, and shipments can be redirected to accommodate changing conditions and needs of customers, vehicles and extraneous factors (e.g., weather and traffic).

When an advance loading manifest is requested, the remote processing center's computing device, utilizing a software logic, will programmatically request an extract (step 840) of all documentation relevant to generating an advance loading manifest for a requesting destination. These sets of documentation are pulled from the computing device's storage in step 830 and compared. In step 850, the relevant information contained in these sets of documentation such as package weight, package dimension, package destination, package delivery requirements, package current location, etc. are fed to the load planning software to produce one or more advance loading manifests.

The generated advance loading manifest can then be transmitted by the remote processing center's computing device to the requesting destination. While it is contemplated that a single remote processing center for at least selected geographic regions, it should be understood that the processing center could also be located at a destination or interim destination, and that any number of processing centers might be utilized to service any particular geographic region. Reception of the advance loading manifest at the requesting destination may be by any acceptable electronic means such as facsimile, hand held computing devices, email, electronic bulletin boards, or direct transmission to the requesting destination's computing devices such as on a network. The requesting destinations may then view and use the generated advance loading manifests (or alternatively access the data to generate their own manifests) to optimize truck loading.

In one exemplary embodiment, the system can be modified to incorporate shipper information from a city dispatch application with the scanned Image to enhance the billing process. Geocoded information provided by the GPS unit can be provided and the account number of the shipper can be looked up using this information. An alternate implementation can comprise the Mobile Data Terminal 102 getting information from the city dispatch application to associate with the shipment. For example when the driver arrives at the customer location (Example—Acme Inc.) he may "arrive" himself at the stop using the city dispatch application 114 which communicates that he has arrived at Acme Inc. The imaging application can query the city dispatch application for current location and attach that information to the document images. It may be possible to also have an implementation where GPS data and geofences are used to auto arrive a driver at a customer location. In addition the departure of the driver could be captured using ECM data to detect that the vehicle is now moving combined with geofence data.

Accordingly, the account number of the shipper associated with the pickup stop can then be used to provide additional document data to the remote facility. Therefore, not only will the remote facility receive the document image, it will also automatically know where the truck was located at the time that the document was transmitted and also what customer or shipper or consignee resides at that location. This information can then be utilized for a variety of purposes, such as for initiating automated billing, sending messages, routing the document immediately, and the like. In one embodiment of the present invention, the mobile data terminal 102 can perform a greater amount of image processing before transmitting to the remote processor. For example, bar code recognition, image enhancement, OCR and ICR can be performed on the mobile terminal prior to the document being transmitted. This can allow more context sensitive behavior.

In a further embodiment, the mobile data terminal 102 has the ability to determine the type of document being scanned. This allows the system to determine when scanning switches to a different shipment document. The mobile data terminal 102 can utilize information on the image (such as a bar code) or that is entered by the driver to determine the document type (whether it is a bill of lading, delivery receipt, or customs paperwork). This can then determine how the document is processed and whether the driver is prompted to provide additional information about the document or to take certain actions. The data terminal can also utilize the document information to determine the start of a new document and the end of a prior document. In another embodiment, the driver can enter information to be associated with document image based upon document type. For example, the driver can be prompted by the data terminal 102 to provide shipment information (essentially PreIndexing the Image)—Pro Numbers, number of Handling Units, Weight, Destination Zip Code, whether or not the shipment has hazardous material, etc. This can also allow enhanced revenue capture opportunities by allowing the driver to enter additional information associated with a shipment such as inside pickup or residential delivery. In addition service delivery information can be captured. For example, if a Delivery Receipt is scanned, the driver can be prompted to acknowledge if the shipment delivered clear (e.g. no overage, shortage, damage). The driver could also be asked questions if it is determined that a delivery receipt was scanned, such as "Did you use your liftgate?" or "Was Inside Delivery Required?" If a Bill of Lading is scanned and detected, the driver can be prompted to enter the number of Handling Units, Weight, Destination Zip Code and if there is any hazardous materials, and whether the driver used the liftgate.

In yet another embodiment, the MDT is capable of handling multiple types of documents associated with a shipment such as Customs Paperwork, according to one embodiment. This embodiment thus provides routing of documents based upon many different criteria. Metadata other than the bar code may be used for the routing, such as document type. In particular, a single shipment can result in multiple documents such as bills of lading and customs paperwork. The document type can be detected by this embodiment, such as by using intelligent character recognition or optical character recognition. Characters and words in the document can be determined and based upon these characters and words, the software automatically determines the document type, such as by comparing the characters and words to known characters and words known to be in certain document types. Then, based upon the document type detected, the document can be routed to the appropriate location or software utility to handle the document (billing, advance loading, shipment management, city dispatch, line haul dispatch, tax reporting, etc).

For example Bills of Lading can be routed to the billing department to allow timely entry. Delivery receipts may be routed to customer service for additional processing. Upon receipt of the image and metadata, the server at the remote processor can pull out the metadata, and store the image in a database. The metadata can be used to control how the document is processed, such as described herein. GPS coordinates in the data can be matched to known and stored customer coordinates (within a tolerance or geofence) and the customer with who the document is associated can then be determined. Accordingly, the document can be stored in the appropriate database and routing of the document and processing of the information can then occur. Appropriate messages can be sent to the customer or others based upon instructions associated with that customer's file regarding what actions are to be taken for documents received related to that customer. A bill can be automatically generated and sent to the customer, and advance loading manifests can be generated based upon the type of package picked up, where it is to be delivered, and the expected time of arrival of the truck back to the terminal. The GPS data also provides a log of where the driver has been and the driver's route and current location at all times. A freight costing software system can then use this information in calculating the shipment cost. The driver can also take a picture of the freight at any event (i.e., pickup, delivery, transportation, etc.), so that the condition and/or nature of the freight can be recorded. The picture can be wirelessly transmitted and stored as well to allow customer service and the claims department to have immediate visibility to the matter.

Embodiments can also provide unload manifest generation and cycle time reduction, such that an unload manifest may be generated before the truck arrives back at the terminal. Embodiments may also provide customers with access/notification of Estimated Time of Delivery, access/notification of Estimated Time of Pickup, and dispatchers visibility to potential to miss customer close times, scheduled appointment times, etc to allow exception based management. Also, embodiments can provide ability for the remote site/facility to determine that an image needs to be rescanned and then trigger notification to the driver to rescan the document.

Additionally, embodiments can provide immediate access to package information for Unload Manifest preparation and line haul planning thus minimizing the cycle time from when driver arrives at terminal and when the trailer can be unloaded and the freight routed appropriately. By minimizing data entry, quicker access to both trailer unload manifest and load plan data is provided.

Figure 10:
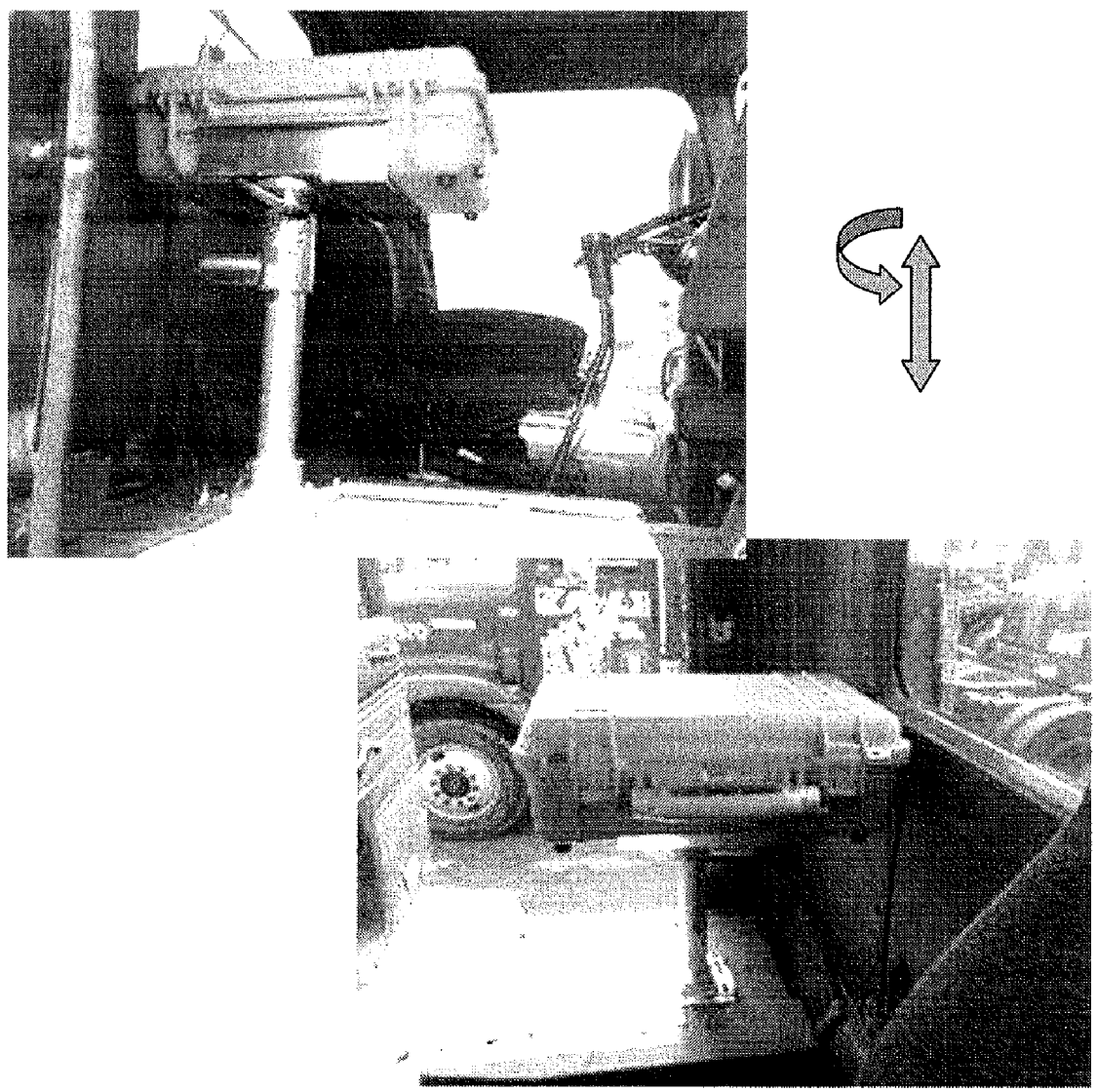
FIG. 10 is a photograph of one exemplary embodiment of the present invention.

Some embodiments can provide improved Mounting of the MDT unit, as well as more ergonomic mounting for ease of use. In particular, a universal Mounting Capability is provided in these embodiments to accommodate heterogeneous fleet. The mounting device has a telescoping stand and an attached swiveling universal mounting plate which can accommodate and support the mobile date terminal. A photograph showing one embodiment of this universal mounting system is illustrated in FIG. 10.

In some embodiments, ability is provided to label all handling units of a shipment. Accordingly, if a shipment has three units (boxes, pallets and the like) associated with it, each unit is labeled with a unique identifier that indicates that it is part of the same shipment but that also it is its own unique piece. This may be performed using preprinted, uniquely indexed bar code labels or dynamically generating labels on demand. If labels are dynamically generated they may contain shipment specific information to allow immediate access without the need to view shipping documents.

In some embodiments, the system is utilized to process delivery receipts. Accordingly, the system of FIG. 1 can be used for delivery receipts in some embodiments. In these embodiments, the delivery receipt is scanned in and transmitted and the proof of delivery information is extracted from the document. The proof of delivery information is then sent to an order management system which then updates the status of the shipment as delivered. The time and date that the delivery receipt was scanned is used as the actual delivery date and time. The signed delivery receipt document image can be made available online to allow customers immediate access to the shipment proof of delivery and access to who signed for the shipment. Automatic notifications can be sent based upon the status of the shipment being changed to delivered.

In such embodiments, document type detection capability can be provided. Accordingly, in these embodiments, the delivery information is captured from the delivery receipt, such as through OCR or ICR recognition. The software then determines that the document is a delivery receipt, such as by comparison of the text to known or expected delivery receipt text or by comparison of the image to known delivery receipt images. Then, based upon determination that the document is a delivery receipt, the document can be routed accordingly, and the delivery information extracted from the document.

In some embodiments, the remote processor can receive the delivery receipt and can be provided with OCR or ICR capability to then extract information from the delivery receipt and process the information accordingly.

The delivery receipt information can then be provided to customers. Thus, in these embodiments, the system provides immediate access to package/shipment proof of delivery (POD), and enables the customer to access to proof of delivery for a package/shipment immediately after delivered.

Accordingly, one or more of the following may be provided by at least some embodiments:
  Improved Asset Visibility and Management
    Equipment location and status
    Equipment mileage
    Equipment condition Real-Time Visibility to shipment status at all times (enable Real-Time Enterprise)
Reduce Cycle Times
Enable Management by Exception
Allow calculating ETAs
Enable detailed package/shipment tracking and tracing
Improved Operational Visibility
Provide visibility to actual Terminal Arrival & Terminal Departure times
Capture detailed information required for accurate freight costing
Streamlined Communications
Minimize need for verbal communication between dispatch and driver
Replace need for separate radios to communicate with dispatch/terminal
Leveraging Document Imaging capabilities to enhance operations execution systems (City Dispatch, Line Haul Dispatch)
Adaptive Behavior—Mobile Data Terminal (MDT)
Enhance MDT to automatically time synch upon power up to ensure accurate event timing
Enhance MDT to optimize Scanner for scanning documents with specific properties
Larger Display
Improved Scanning As can be understood the functionalities of the systems, methods, models, and algorithms described herein can be implemented using software, firmware, and/or associated hardware circuitry for carrying out the desired task. For instance, the various functionalities described can be programmed as a series of instructions, code, or commands using general purpose or special purpose programming languages, and can be executed on one or more general purpose or special purpose computers, controllers, processors or other control circuitry.

The foregoing description of the embodiments has been presented for purposes of illustration and description. It is not intended to be exhaustive nor to limit the invention to the precise form disclosed. Many alternatives, modifications, and variations will be apparent to those skilled in the art in light of the above teaching. Accordingly, it is intended to embrace all alternatives, modifications, and variations that fall within the spirit and broad scope the amended claims.

What is claimed is:

1. A method of remotely monitoring at least one trailer attached to a vehicle comprising:
associating an identification tag with the trailer, wherein the identification tag is configured to broadcast a trailer identification signal;
receiving the trailer identification signal on-board the vehicle;
associating the trailer identification signal with the vehicle;
requesting the trailer identification signal and trailer information from the vehicle by a remote processor, wherein the trailer information comprises at least one of a trailer mileage, a trailer location, a date and a time;
transmitting the trailer identification signal and the trailer information to the remote processor; and
generating a hook or unhook event based at least in part on the trailer identification signal and the trailer information.

2. The method as claimed in claim 1 wherein the method further comprises transmitting a trailer location to the remote processor.

3. The method as claimed in claim 1 wherein the steps of receiving the trailer identification signal, associating the identification signal with the vehicle and transmitting the trailer identification signal to a remote processor are performed by a mobile data terminal device positioned within the vehicle.

4. The method as claimed in claim 3 wherein:
a wired communication link electrically couples the identification tag to the mobile data terminal device; and
the trailer identification signal is broadcasted to the mobile data terminal device through the wired communication link by way of parallel or serial communication.

5. The method as claimed in claim 4 wherein the identification tag is configured as a programmable power line communication tag attached to the trailer that communicates with the mobile data terminal device.

6. The method as claimed in claim 3 wherein the identification tag is configured to wirelessly broadcast at least the trailer identification signal to the mobile data terminal device.

7. The method as claimed in claim 6 wherein the identification tag communicates directly with the mobile data terminal device.

8. The method as claimed in claim 6 wherein the identification tag communicates indirectly with the mobile data terminal device via a vehicle communication bus.

9. The method as claimed in claim 8 wherein the communication bus comprises at least one of a J2497 PLC4Trucks Bus, J1708 bus and J1939 bus.

10. The method as claimed in claim 6 wherein the identification tag is configured as an RFID tag attached to the trailer that communicates with the mobile data terminal device.

11. The method as claimed in claim 4 wherein the wired communication link comprises at least one of a J2497 PLC4Trucks Bus, J1708 bus and J1939 bus.

12. The method as claimed in claim 1 wherein the steps of requesting the trailer identification signal and trailer information from the vehicle, receiving the trailer identification signal and the trailer information and generating an event are performed by the mobile data terminal.

13. The method as claimed in claim 1 wherein the event comprises receiving a rerouting dispatch signal from the remote processor to the mobile data terminal device.

14. The method as claimed in claim 1 wherein the event comprises electronically sending an estimated time of arrival to a customer when the vehicle is within a predetermined distance of a customer.

* * * * *